United States Patent
Yuan et al.

(10) Patent No.: US 12,518,512 B2
(45) Date of Patent: Jan. 6, 2026

(54) TRAINING VISION MODELS WITH UNIFIED CONTRASTIVE LEARNING

(71) Applicant: Microsoft Technology Licensing, LLC, Redmond, WA (US)

(72) Inventors: Lu Yuan, Redmond, WA (US); Chunyuan Li, Redmond, WA (US); Jianwei Yang, Kenmore, WA (US); Bin Xiao, Sammamish, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 615 days.

(21) Appl. No.: 17/821,596

(22) Filed: Aug. 23, 2022

(65) Prior Publication Data
US 2023/0162481 A1    May 25, 2023

Related U.S. Application Data

(60) Provisional application No. 63/264,369, filed on Nov. 21, 2021.

(51) Int. Cl.
*G06V 10/774* (2022.01)
*G06F 40/126* (2020.01)
*G06F 40/186* (2020.01)
*G06T 9/00* (2006.01)

(52) U.S. Cl.
CPC .......... *G06V 10/774* (2022.01); *G06F 40/126* (2020.01); *G06F 40/186* (2020.01); *G06T 9/00* (2013.01)

(58) Field of Classification Search
CPC .... G06V 10/774; G06V 10/82; G06F 40/126; G06F 40/186; G06F 40/30; G06T 9/00
See application file for complete search history.

(56) References Cited

U.S. PATENT DOCUMENTS

2022/0360668 A1*  11/2022  Brink .............. G10L 15/22

OTHER PUBLICATIONS

Bengio (Curriculum learning. In Proceedings of the 26th annual international conference on machine learning, pp. 41-48. 2009 (Year: 2009).*
Houlsby (Parameter-efficient transfer learning for NLP. In International conference on machine learning; 2019.). (Year: 2019).*
Zhang ("Vinvl: Revisiting visual representations in vision-language models." In Proceedings of the IEEE/CVF conference on computer vision and pattern recognition, pp. 5579-5588. Mar. 2021). (Year: 2021).*

(Continued)

*Primary Examiner* — Wassim Mahrouka
(74) *Attorney, Agent, or Firm* — Alleman Hall & Tuttle LLP

(57) ABSTRACT

Examples are provided for pre-training a computer vision foundation model. A representative method comprises curating a pre-training database of image-text pairs from weakly labeled data. Language is encoded of text descriptions from the image-text pairs. The images of the image-text pairs are encoded using a hierarchical vision transformer with shifted windows and convolutional embedding. Based on the encoded images and the encoded language, the computer vision foundation model is pre-trained via unified image-text contrastive learning.

19 Claims, 5 Drawing Sheets

(56) References Cited

OTHER PUBLICATIONS

"eValai", Retrieved from: https://web.archive.org/web/20220423180430/http://evalai.com/index.html, Apr. 23, 2022, 7 Pages.
"Object Detection Datasets", Retrieved from: https://web.archive.org/web/20220316141747/https://public.roboflow.com/object-detection, Mar. 16, 2022, 3 Pages.
"Wu Dao 2.0", Retrieved from: https://web.archive.org/web/20210928230819/https://gpt3demo.com/apps/wu-dao-20, Sep. 2021, 5 Pages.
Akbari, et al., "Vatt: Transformers for multimodal self-supervised learning from raw video, audio and text", In Proceedings of 35th Conference on Neural Information Processing Systems, Dec. 6, 2021, 16 Pages.
Alayrac, et al., "Self-Supervised MultiModal Versatile Networks", In Proceedings of 34th Conference on Neural Information Processing Systems, Dec. 6, 2020, pp. 1-13.
Anderson, et al., "Bottom-Up and Top-Down Attention for Image Captioning and Visual Question Answering", In Proceedings of the IEEE conference on computer vision and pattern recognition, Jun. 18, 2018, pp. 6077-6086.
Antol, et al., "VQA: Visual Question Answering", In Proceedings of IEEE International Conference on Computer Vision, Dec. 7, 2015, pp. 2425-2433.
Arnab, et al., "ViViT: A Video Vision Transformer", In Proceedings of the IEEE/CVF International Conference on Computer Vision, Oct. 2021, pp. 6836-6846.
Bain, et al., "Frozen in Time: A Joint Video and Image Encoder for End-to-End Retrieval", In Proceedings of the IEEE/CVF International Conference on Computer Vision, Oct. 11, 2021, pp. 1728-1738.
Bansal, et al., "Zero-shot object detection", In Proceedings of the European Conference on Computer Vision, Sep. 8, 2018, pp. 1-17.
Berg, et al., "Bird snap: Large-scale fine-grained visual categorization of birds", In Proceedings of IEEE Conference on Computer Vision and Pattern Recognition, Jun. 23, 2014, pp. 1-8.
Bommasani, et al., "On the Opportunities and Risks of Foundation Models", In Repository of arXiv:2108.07258v1, Aug. 16, 2021, 211 Pages.
Brown, et al., "Language Models are Few-Shot Learners", In Repository of arXiv:2005.14165v1, May 28, 2020, pp. 1-72.
Carreira, et al., "A Short Note about Kinetics-600", In Repository of arXiv:1808.01340v1, Aug. 3, 2018, pp. 1-6.
Changpinyo, et al., "Conceptual 12M: Pushing web-scale image-text pre-training to recognize long-tail visual concepts", In Proceedings of the IEEE/CVF Conference on Computer Vision and Pattern Recognition, Jun. 19, 2021, pp. 3558-3568.
Chen, et al., "A Simple Framework for Contrastive Learning of Visual Representations", In Proceedings of the 37th International Conference on Machine Learning, Jul. 2020, 11 Pages.
Chen, et al., "Big Self-Supervised Models are Strong Semi-Supervised Learners", In Repository of arXiv:2006.10029v1, Jun. 17, 2020, 17 Pages.
Chen, et al.,"Learning the best pooling strategy for visual semantic embedding", In Repository of arXiv:2011.04305v1, Nov. 9, 2020, 14 Pages.
Chen, et al., "Multimodal Clustering Networks for Self-supervised Learning from Unlabeled Videos", In Proceedings of the IEEE/CVF International Conference on Computer Vision, Oct. 11, 2021, pp. 8012-8021.
Chen, et al., "UNITER: universal image-text representation learning.", In proceedings of 16th European Conference on Computer Vision, Aug. 23, 2020, pp. 1-17.
Codella, et al., "Skin Lesion Analysis Toward Melanoma Detection 2018: A Challenge Hosted by the International Skin Imaging Collaboration (ISIC)", In Repository of arXiv:1902.03368v1, Feb. 9, 2019, 8 Pages.
Dai, et al., "CoAtNet: Marrying Convolution and Attention for All Data Sizes", In Repository of arXiv:2106.04803v1, Jun. 9, 2021, 17 Pages.
Dai, et al., "Dynamic Head: Unifying Object Detection Heads with Attentions", In Proceedings of the IEEE/CVF Conference on Computer Vision and Pattern Recognition, Jun. 20, 2021, pp. 7373-7382.
Dai, et al., "Dynamic DETR: End-to-end object detection with dynamic attention", In Proceedings of IEEE/CVF International Conference on Computer Vision (ICCV), Oct. 10, 2021, pp. 2988-2997.
Deng, et al., "ImageNet: A Large-Scale Hierarchical Image Database", In Proceedings of the IEEE Conference on Computer Vision and Pattern Recognition, Jun. 20, 2009, pp. 248-255.
Devlin, et al., "BERT: Pre-training of deep bidirectional transformers for language understanding", In Repository of arXiv:1810.04805v2, May 24, 2019, 16 Pages.
Dong, et al., "CSWin transformer: A general vision transformer backbone with cross-shaped windows", In Repository of arXiv:2107.00652v2, Jul. 15, 2021, pp. 1-21.
Zhou, et al., "Simple multi-dataset detection", In Repository of arXiv:2102.13086v1, Feb. 25, 2021, 12 pages.
Dosovitskiy, et al., "An Image is Worth 16×16 Words: Transformers for Image Recognition at Scale", In Proceedings of The Ninth International Conference on Learning Representations, Jun. 3, 2021, pp. 1-22.
Dou, et al., "An empirical study of training end-to-end vision-and-language transformers", In Repository of arXiv:2111.02387v1, Nov. 3, 2021, 11 Pages.
Fang, et al., "Compressing visual-linguistic model via knowledge distillation", In Proceedings of the IEEE/CVF International Conference on Computer Vision, Oct. 11, 2021, pp. 1428-1438.
Gan, et al., "Large-scale adversarial training for vision-and- language representation learning", In Proceedings of 34th Conference on Neural Information Processing Systems, Dec. 6, 2020, pp. 1-13.
Gao, et al., "Scaling deep contrastive learning batch size under memory limited setup", In Repository of arXiv:2101.06983v2, Jun. 14, 2021, 6 pages.
Gemmeke, et al., "Audio Set: An ontology and human-labeled dataset for audio events", In Proceedings of IEEE International Conference on Acoustics, Speech and Signal Processing, Mar. 5, 2017, pp. 776-780.
Girshick, et al., "Rich Feature Hierarchies for Accurate Object Detection and Semantic Segmentation", In Proceedings of the IEEE Conference on Computer Vision and Pattern Recognition, Jun. 23, 2014, pp. 1-8.
Goyal, et al., "Making the V in VQA Matter: Elevating the Role of Image Understanding in Visual Question Answering", In Proceedings of the IEEE conference on computer vision and pattern recognition, Jul. 21, 2017, pp. 6904-6913.
Gupta, et al., "LVIS: A dataset for large vocabulary instance segmentation", In Proceedings of the IEEE/CVF conference on computer vision and pattern recognition, Jun. 16, 2019, pp. 5356-5364.
Helber, et al., "EuroSAT: A Novel Dataset and Deep Learning Benchmark for Land Use and Land Cover Classification", In IEEE Journal of Selected Topics in Applied Earth Observations and Remote Sensing, vol. 12, Issue 7, Jul. 2019, pp. 2217-2226.
Huang, Xuedong, "A holistic representation toward integrative AI", Retrieved from: https://www.microsoft.com/en-us/research/blog/a-holistic-representation-toward-integrative-ai/, Oct. 20, 2020, 6 pages.
Huang, et al., "Pixel-BERT: Aligning image pixels with text by deep multi-modal transformers", In Repository of arXiv:2004.00849v2, Jun. 22, 2020, pp. 1-17.
Jia, et al., "Scaling Up Visual and Vision-Language Representation Learning With Noisy Text Supervision", In the Proceedings of the 38th International Conference on Machine Learning, vol. 139, Jul. 18, 2021, 13 Pages.
Kamath, et al., "MDETR—modulated detection for end-to-end multi-modal understanding", In Proceedings of the IEEE/CVF International Conference on Computer Vision, Oct. 11, 2021, pp. 1780-1790.
Kay, et al., "The kinetics human action video dataset", In Repository of arXiv:1705.06950v1, May 19, 2017, 22 Pages.
Kim, et al., "ViLT: Vision-and-language transformer without convolution or region supervision", In Proceedings of the 38th International Conference on Machine Learning, Jul. 1, 2021, 12 pages.

(56) References Cited

OTHER PUBLICATIONS

Kolesnikov, et al., "Big Transfer (BiT): General Visual Representation Learning", In Proceedings of the European Conference on Computer Vision, Oct. 29, 2020, 17 Pages.

Kornblith, et al., "Do better imagenet models transfer better?", In Proceedings of the IEEE/CVF Conference on Computer Vision and Pattern Recognition, Jun. 16, 2019, pp. 2661-2671.

Krishna, et al., "Visual Genome Connecting Language and Vision Using Crowdsourced Dense Image Annotations", In Repository of arXiv:1602.07332v1, Feb. 23, 2016, pp. 1-44.

Li, et al., "Align before fuse: Vision and language representation learning with momentum distillation", In Proceedings of Conference on Neural Information Processing Systems, Dec. 6, 2021, pp. 1-12.

Li, et al., "Oscar: Object-semantics aligned pre-training for vision-language tasks", In Proceedings of European Conference on Computer Vision, Aug. 23, 2020, pp. 1-21.

Li, et al., "UNIMO: Towards Unified-Modal Understanding and Generation via Cross-Modal Contrastive Learning", In Proceedings of the 59th Annual Meeting of the Association for Computational Linguistics, Aug. 1, 2021, pp. 2592-2607.

Zoph, et al., "Rethinking Pre-training and Self-training", In Proceedings of 34th Conference on Neural Information Processing Systems, Dec. 6, 2020, pp. 1-13.

Lin, et al., "Microsoft COCO: Common Objects in Context", In Repository of arXiv:1405.0312v3, Feb. 21, 2015, pp. 1-15.

Lin, et al., "Microsoft COCO: common objects in context", In Repository of arXiv:1405.0312v1, May 1, 2014, pp. 1-14.

Liu, et al., "Feature Transformation Ensemble Model with Batch Spectral Regularization for Cross-Domain Few-Shot Classification", In Repository of arXiv:2005.08463v1, May 18, 2020, 4 Pages.

Liu, et al., "RoBERTa: A robustly optimized BERT pretraining approach", In Repository of arXiv:1907.11692v1, Jul. 26, 2019, 13 Pages.

Liu, et al., "Swin transformer: Hierarchical vision transformer using shifted windows", In Proceedings of 2021 IEEE/CVF International Conference on Computer Vision, Oct. 10, 2021, pp. 9992-10002.

Liu, et al., "Video swin transformer", In Repository of arXiv:2106.13230v1, Jun. 24, 2021, 12 pages.

Miech, et al., "End-to-End Learning of Visual Representations from Uncurated Instructional Videos", In Proceedings of IEEE/CVF Conference on Computer Vision and Pattern Recognition, Jun. 14, 2020, pp. 9879-9889.

Miech, et al., "HowTo100M: Learning a Text-Video Embedding by Watching Hundred Million Narrated Video Clips", In International Conference on Computer Vision, Oct. 27, 2019, pp. 2630-2640.

Mohanty, et al., "Using deep learning for image-based plant disease detection", In Journal of Frontiers Plant Science, vol. 7, Article 1419, Sep. 22, 2016, pp. 1-10.

Ordonez, et al., "Im2text: Describing images using 1 million captioned photographs", In Proceedings of 25th Annual Conference on Neural Information Processing Systems, Dec. 12, 2011, pp. 1-9.

Plummer, et al., "Flickr30k entities: Collecting region-to-phrase correspondences for richer image-to-sentence models", In Repository of arXiv:1505.04870v3, Apr. 15, 2016, 21 Pages.

Qi, et al., "ImageBERT: Cross-modal Pre-training with Large-scale Weak-supervised Image-Text Data", In repository of arXiv:2001.07966v2, Jan. 23, 2020, pp. 1-12.

Radford, et al., "Learning Transferable Visual Models From Natural Language Supervision", In Repository of arXiv:2103.00020v1, Feb. 26, 2021, 48 Pages.

Rajbhandari, et al., "ZeRO: Memory Optimization Towards Training a Trillion Parameter Models", In Repository of arXiv:1910.02054v2, Oct. 7, 2019, 17 Pages.

Ramesh, et al., "Zero-shot text-to-image generation", In Repository of arXiv:2102.12092v2, Feb. 26, 2021, 20 Pages.

Ryoo, et al., "TokenLearner: What Can 8 Learned Tokens Do for Images and Videos?", In Repository of arXiv:2106.11297v2, Oct. 5, 2021, pp. 1-21.

Shao, et al., "Objects365: A Large-scale, High-quality Dataset for Object Detection", In Proceedings of the IEEE/CVF International Conference on Computer Vision, Oct. 27, 2019, pp. 8430-8439.

Sharma, et al., "Conceptual Captions: A Cleaned, Hypernymed, Image Alt-text Dataset For Automatic Image Captioning", In Proceedings of the 56th Annual Meeting of the Association for Computational Linguistics, vol. 1, Jul. 15, 2018, pp. 2556-2565.

Shen, et al., "How much can clip benefit vision-and-language tasks?", In Repository of arXiv:2107.06383v1, Jul. 13, 2021, 14 Pages.

Tschandl, et al., "The HAM10000 dataset, a large collection of multi-source dermatoscopic images of common bigmented skin lesions", In Journal of Nature Scientific Data, vol. 5, Issue 1, Aug. 14, 2018, 9 Pages.

Vaswani, et al., "Attention is All you Need", In Proceedings of 31st Conference on Neural Information Processing Systems, Dec. 4, 2017, 11 Pages.

Wang, et al., "Chestx-ray8: Hospital-scale chest x-ray database and benchmarks on weakly-supervised classification and localization of common thorax diseases", In Repository of arXiv:1705.02315v1, May 5, 2017, pp. 1-15.

Yuan, et al., "Florence: A New Foundation Model for Computer Vision", In Repository of arXiv:2111.11432v1, Nov. 22, 2021, 17 Pages.

Wang, et al., "MiniVLM: A Smaller and Faster Vision-Language Model", In Repository of arXiv:2012.06946v1, Dec. 13, 2020, pp. 1-11.

Wang, et al., "SimVLM: Simple Visual Language Model Pretraining with Weak Supervision", In Repository of arXiv:2108.10904v1, Aug. 24, 2021, 16 Pages.

Wu, et al., "CvT: Introducing convolutions to vision transformers", In Proceedings of International Conference on Computer Vision, Oct. 11, 2021, pp. 22-31.

Xie, et al., "Self-training with noisy student improves imagenet classification", In Proceedings of the IEEE/CVF Conference on Computer Vision and Pattern Recognition, Jun. 13, 2020, pp. 10687-10698.

Xu, et al., "End-to-End Semi-Supervised Object Detection with Soft Teacher", In Proceedings of the IEEE/CVF International Conference on Computer Vision, Oct. 11, 2021, pp. 3060-3069.

Xu, et al., "MSR-VTT: A Large Video Description Dataset for Bridging Video and Language", In Proceedings of the EEE conference on computer vision and pattern recognition, Jun. 26, 2016, pp. 5288-5296.

Xu, et al., "VideoCLIP: Contrastive pre-training for zero-shot video-text understanding", In Proceedings of the Conference on Empirical Methods in Natural Language Processing, Nov. 7, 2021, pp. 6787-6800.

Xue, et al., "Probing inter-modality: Visual parsing with self-attention for vision-language pre-training", In Proceedings of 35th Conference on Neural Information Processing Systems, Dec. 6, 2021, 15 Pages.

Yang, et al., "Focal self-attention for local-global interactions in vision transformers", In Repository of arXiv:2107.00641v1, Jul. 1, 2021, 21 Pages.

Yang, et al., "Unified Contrastive Learning in Image-Text-Label Space", In Proceedings of the IEEE/CVF Conference on Computer Vision and Pattern Recognition, Jun. 19, 2022, pp. 19163-19173.

Yao, et al., "FILIP: Fine-grained interactive language-image pre-training", In Repository of arXiv:2111.07783v1, Nov. 9, 2021, pp. 1-18.

Yu, et al., "A joint sequence fusion model for video question answering and retrieval", In Proceedings of 15th European Conference on Computer Vision, Sep. 8, 2018, pp. 1-17.

Yu, et al., "ERNIE-ViL Knowledge enhanced vision-language representations through scene graph", In Repository of arXiv:2006.16934v1, Jun. 30, 2020, 11 Pages.

Zhai, et al., "Scaling vision transformers", In Repository of arXiv:2106.04560v1, Jun. 8, 2021, pp. 1-31.

Zhang, et al., "Multi-Scale Vision Longformer: A New Vision Transformer for High-Resolution Image Encoding", In Proceedings of the IEEE/CVF International Conference on Computer Vision, Oct. 11, 2021, pp. 2998-3008.

(56) References Cited

OTHER PUBLICATIONS

Zhang, et al., "Vinvl: Making visual representations matter in vision-language models", In Repository of arXiv:2101.00529v1, Jan. 2, 2021, pp. 1-30.

Zhang, et al., "VinVL: Revisiting Visual Representations in Vision-Language Models", In Proceedings of the IEEE/CVF Conference on Computer Vision and Pattern Recognition, Jun. 19, 2021, pp. 5579-5588.

Huang, et al., "Seeing out of the box: End-to-end pre-training for vision-language representation learning", In Proceedings of the IEEE/CVF Conference on Computer Vision and Pattern Recognition, Jun. 19, 2021, pp. 12976-12985.

Guo, et al., "A New Benchmark for Evaluation of Cross-Domain Few-Shot Learning", In Repository of arXiv:1912.07200v1, Dec. 16, 2019, pp. 1-11.

"Open Images dataset", Retrieved from: https://github.com/openimages/dataset/blob/main/READMEV1.md, Jul. 20, 2017, 6 Pages.

Fei N., et al., "WenLan 2.0: Make AI Imagine via a Multimodal Foundation Model", In Repository of arXiv:2110.14378v1, Oct. 27, 2021, 20 Pages.

ISA European Patent Office, International Search Report and Written Opinion Issued in PCT Application No. PCT/US22/043568, Mailed Date: Dec. 13, 2022, 9 Pages.

Rahate A., et al., "Multimodal Co-learning: Challenges, Applications with Datasets, Recent Advances and Future Directions", In Repository of arXiv: 2107.13782, Jul. 29, 2021, 77 Pages.

Zhai X., et al., "LiT: Zero-Shot Transfer with Locked-image Text Tuning", In Repository of arXiv: 2111.07991v1, Nov. 15, 2021, 19 Pages.

First Examination Report Received for Indian Application No. 202447039858, mailed on Jul. 31, 2025, 09 Pages.

\* cited by examiner

TRAINING VISION MODELS WITH UNIFIED CONTRASTIVE LEARNING

CROSS REFERENCE TO RELATED APPLICATIONS

This application claims priority to U.S. Provisional Patent Application Ser. No. 63/264,369, filed Nov. 21, 2021, the entirety of which is hereby incorporated herein by reference for all purposes.

BACKGROUND

Automated visual understanding of our diverse and open world requires computer vision models that generalize well with minimal customization for specific tasks, similar to human vision. Computer vision foundation models, which are trained on large-scale diverse data sets and can be adapted to a wide range of downstream tasks, are critical to solve real-world computer vision applications.

Computer vision applications are generally trained using exhaustive sets of training data, often including pairs of text and images generated with supervision. Such training may be mediated using neural networks. The trained vision model may then be deployed to recognize images based on their similarity to the training data.

A challenge in computer vision lies in generating a scalable pre-training system that is also transferable. For example, many existing platforms use text-image pre-training methods with large scale data training. As such, the models are essentially trained to perform zero-shot learning tasks, and can only be transferred or adapted to related computer vision schemes. Such models do not have broad general transferability.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

Examples are provided for pre-training a computer vision foundation model. A representative method comprises curating a pre-training database of image-text pairs from weakly labeled data. Language is encoded of text descriptions from the image-text pairs. The images of the image-text pairs are encoded using a hierarchical vision transformer with shifted windows and convolutional embedding. Based on the encoded images and the encoded language, the computer vision foundation model is pre-trained via unified image-text contrastive learning.

DETAILED DESCRIPTION

Figure 1:
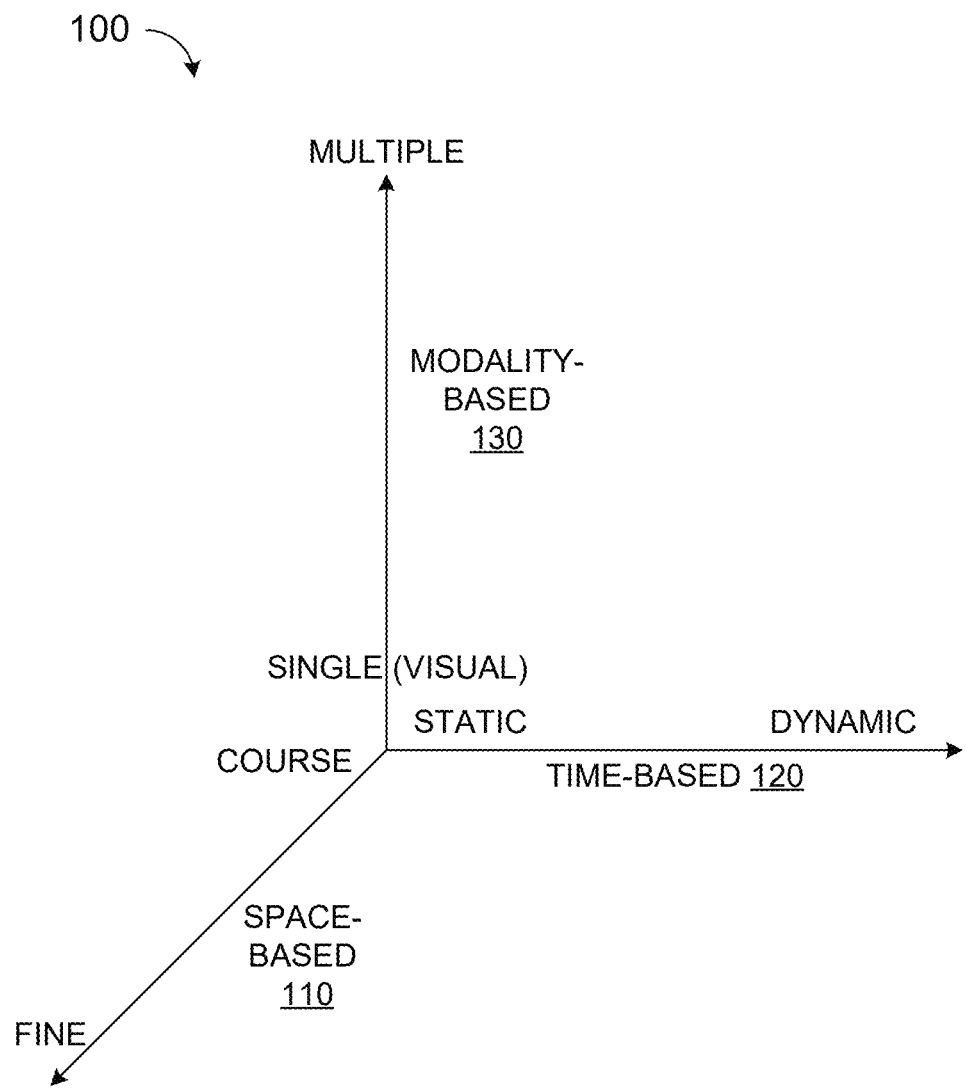
FIG. 1 shows an illustration of a problem space for computer vision tasks.

Progress in Artificial Intelligence (AI) is often limited when specific models have to be developed to solve specific problems. Such models often rely on supervised training that is further limited by human input capabilities. More rapid progress can be made using cross-modal, holistic models that are capable of solving diverse real-world problems without significant human involvement. Thus, approaches that build cross-modal representations that can be efficiently adapted to various downstream tasks with minimal additional information or interventions are highly desired. One such approach is XYZcode, where monolingual text (X), audio and visual sensory signals (Y), and multilingual data (Z) are organically integrated to create AI models that can speak, hear, see, and understand. Other approaches attempt to build a single model that can be generalized across millions of tasks.

One fundamental tool within these sets of approaches is foundation models. The term may be applied to any model that is trained from broad data sets at a scale that is capable of being adapted (e.g., fine-tuned) to a wide range of downstream tasks. Foundation models are important due to their impressive performance and generalization capabilities. Adaptable foundation models may be quickly integrated and deployed into real-world AI systems by many researchers and developers.

Although foundation models have already demonstrated huge impact in natural language processing (NLP), and in computer vision, standard practice still involves pre-training models on large, annotated data sets. More recently, large-scale pre-training methods that learn directly from web-scale image-text pairs, show encouraging progress for efficient transfer learning, and zero-shot capability. However, such models have been limited to tasks such as classification, retrieval, and tagging of images. Broader adaptability and transferability have proven more challenging.

While existing vision foundation models focus mainly on mapping images and textual representations to a cross-modal shared representation, this detailed specification describes a computer vision foundation model that builds expansive representations able to support space-based tasks (e.g., coarse (scene) to fine (object)), time-based tasks (e.g., static (images) to dynamic (videos)), and modality-based tasks (e.g., single modalities (image only) to multiple modalities (caption, depth)).

Such a computer vision foundation model may be pre-trained based on curated universal visual-language representations from web-scale image-text pairs. Images from the curated image-text pairs may be encoded using a hierarchical vision transformer with shifted windows and convolutional embedding. The encoded images and encoded language may then be used to pre-train the computer vision foundation model via unified image-text contrastive learning.

Such a computer vision foundation model can be easily adapted for various vision and vision-language tasks, such as classification, retrieval, object detection, visual question answering (VQA), fine-grained V+L fusion, image captioning, video retrieval and action recognition. The model may further be configured to support depth/flow estimation, tracking functions, and other high level vision tasks. Further, the model may support many types of transfer learning, such as fully sampled fine-tuning, linear probing and evaluation, few-shot transfer and zero-shot transfer for novel images and objects.

Using the computer vision foundation model described herein, retrieval tasks can be provided, such as image classification tasks that can facilitate retrieval and tagging of images, etc. The computer vision foundation model can be customized to industry manufacturing scenarios, such as augmented reality and automated vehicle applications, tuning, few shot transfer, zero-shot transfer, and linear evaluation. As such, the technical effects of implementing this computer vision foundation model may include reducing consumption of computing resources, and the generation of new data structures that facilitate data retrieval and analysis.

Referring to FIG. 1, a spectrum of computer vision tasks can be plotted in a problem space 100 with three orthogonal axes: space-based 110, time-based 120, and modality-based 130. Space-based tasks may range from coarse recognition (e.g. scene-level classification) to fine-grained recognition (e.g. object detection, segmentation). Time-based tasks may range from static (e.g. images) to dynamic (e.g. videos). Time-based tasks may further include recognition tasks over multiple frames, yielding video dynamics and video-based tasks. Modality-based tasks may range from monochromatic or red-green-blue (RGB) only to multiple senses (e.g. captioning and depth). Any visual understanding task can be mapped to problem space 100. In order to be applicable to a wide range of tasks, a functional computer vision foundation model preferably is able to solve tasks in all three dimensions.

Figure 2:
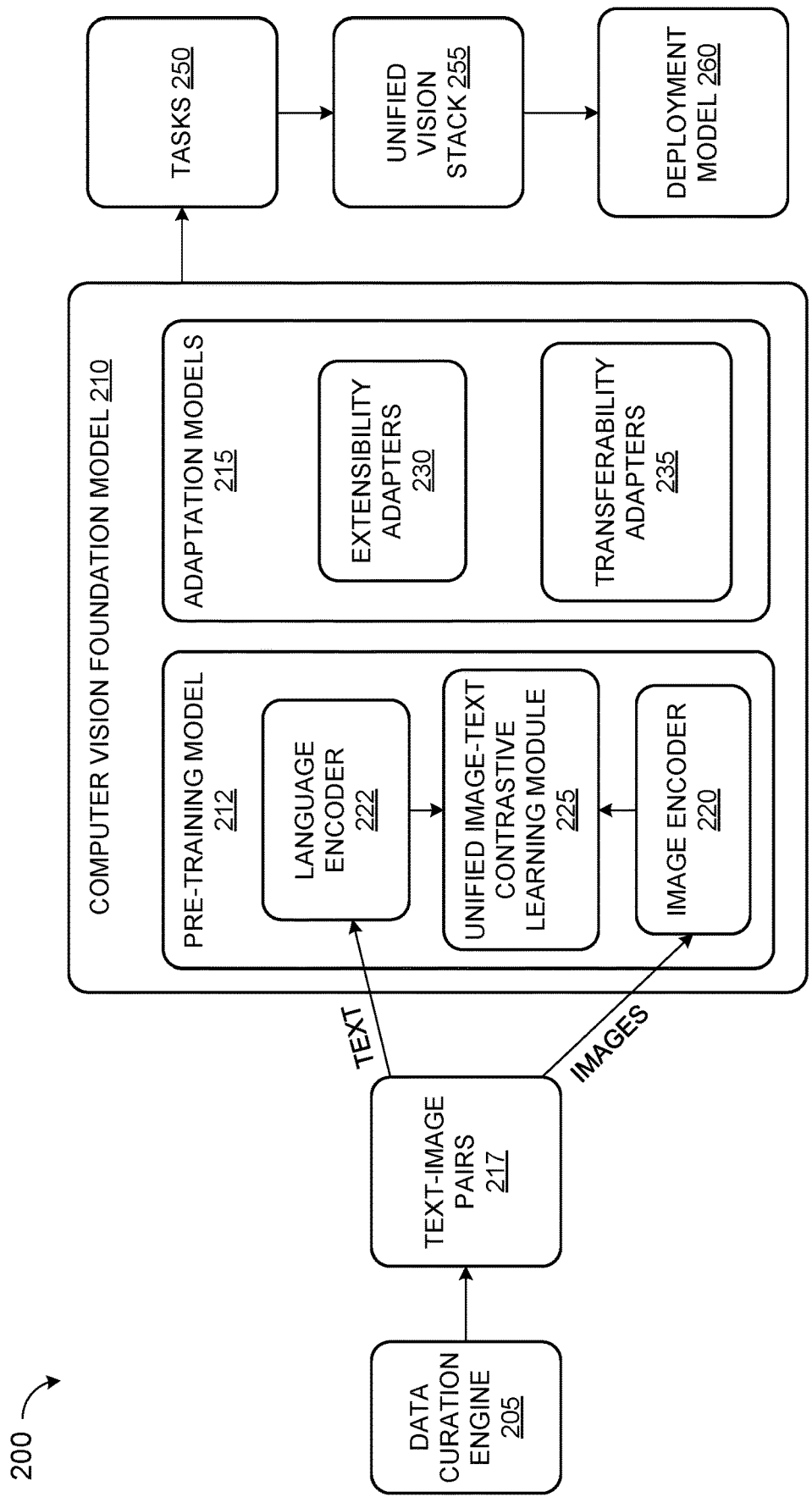
FIG. 2 schematically shows an example computer vision development system.

FIG. 2 schematically shows an example computer vision development system 200. Computer vision development system 200 includes data curation engine 205, which may curate image-text datasets from weakly labeled data, such as web-scale data available publicly on the internet. As used herein, curation generally refers to the careful, expert selection of items, to bring about a desired outcome or effect. For example, data curation engine 205 may collect image data and associated metadata from image sources (e.g., web, other databases), convert the image data and associated metadata into a same format, clean and/or augment the images and metadata, and generate one or more datasets in a format that can be used subsequently by one or more computing systems and/or models.

Curated data may be used to develop computer vision foundation model 210. Computer vision foundation model 210 may be divided into two parts. One part is a pre-training model 212 (shown on the left side). The other part is a set of adaptation models 215 (shown on the right side). The adaptation models extend the capabilities of the pre-trained model so the foundation model can support two or more different tasks.

To learn from image-text pairs 217, such as the noisy web-scale data curated by data curation engine 205, pre-training model 212 may comprise a two-tower architecture including an image encoder 220 and a language encoder 222. The two-tower architecture allows for end-to-end training of pre-training model 212 via unified image-text contrastive learning module 225. The pre-trained model generated by pre-training model 212 may be provided to a plurality of adaptation models 215. Adaptation models 215 may include one or more extensibility adapters 230 (e.g., to extend the ability of the model along one or more of axes 110, 120, and 130), and one or more transferability adapters 235 (e.g., to transfer the pre-trained model to scenarios such as zero-shot, few-shot, etc.).

Computer vision foundation model 210 may be pre-trained on increasingly large data sets via scalable training infrastructure 240. Once pre-trained and adapted, computer vision foundation model 210 may be trained on any number of tasks 250, such as image retrieval, image classification, object detection, VQA, action recognition, object tracking, etc. Trained tasks may then be collected into a unified vision stack 255, configured to perform the set of vision tasks in the field. Unified vision stack 255 may then be deployed into real-world applications via one or more deployment models 260. Such real-world applications may include computer and/or cloud-based image retrieval, parsing, and analysis, cognition services, AI scenarios that depend on machine vision, such as vehicle safety and automated driving, manufacturing, surgery, image recognition in wearable and/or portable devices, security analysis, etc.

Traditionally in computer vision, labeled data is leveraged for the pre-training. A dataset is used to pre-train vision models to a backbone, then the backbone used in fine tuning to different tasks. Herein, pre-training model 212 may be trained from weakly labeled and/or weakly supervised labeled data. Human annotations are not needed to support fully automated pre-training. Since fully supervised learning is not required at this stage, the system can be scalable to the data.

Foundation models rely on large scale data for pre-training. As one example, data curation engine 205 may curate publicly available images on the Internet with natural language weak supervision to generate any suitable number of weakly labeled image-text pairs for training (e.g., on the order of one billion image-text pairs). For example, data curation engine 205 may include a programmatical data curation pipeline that processes internet images and their raw descriptions in parallel. However, other large data sets may be used that are not entirely or not at all publicly available. Selection and post-filtering may be employed to ensure data relevance and quality while respecting legal and ethical constraints. To improve data quality, data filtering may be applied, such as hash-based near-duplicate image removal, small-size image removal, image-text relevance, etc. prior to or following sampling.

Within an image text pair, the text may include the title of the image, a hashtag from the image, layover text from the image, surrounding text from the image, etc. Any available texts may be saved in meta data associated with each image. Several steps may be used to clean up small size images, low quality images, etc., and to follow legal and privacy standards by filtering out personal information, blurring identifications, etc. Images may be subject to removing duplication, removing noise, and removing associations between unrelated text and images. Some images may be sampled and attach to text according to vocabulary densities. For example, a query may be calculated with a long tail distributed across a set of image text pair examples.

Hashtags and other text identifiers may not have uniform qualities, e.g., the text may be shorter or longer. Before fitting the data, hashtables are performed where identical words are mapped into the same hash tag and hash key and get the same corresponding hash value. This in turn, informs data merging considerations, selection of naive classification clustering for the text descriptions, etc. Other hashtags may indicate whether an image can be grouped into multiple categories. Image text pairs with above threshold quality may then be passed to an encoder.

Language encoder 222 may be any suitable language encoder that produces encoded language data usable by unified image-text contrastive learning module 225. As a non-limiting example, language encoder 222 may include a 12-layer transformer with a [CLS] token as the language encoder kernel.

Image encoder 220 may include a hierarchical vision transformer with shifted windows and convolutional embedding. As an example, the hierarchical vision transformer may combine aspects of the swin hierarchical vision transformer (e.g., shifted windows) with a convolutional vision transformer (CVT). For example, the shifted windows approach (e.g., overlapping, sliding windows of data) of the swin transformer may be used to look at the local attention, thereby saving memory when compared to traditional transformers that run full attention mechanisms. The convolutional operations may be used by the transformer to consider spatial relationships.

The swin transformer is one example of a vision transformer that builds hierarchical feature maps by merging image patches in deeper layers. Swin employs linear computation complexity to input image size due to the shifted windows approach, as the self-attention is computed only within each local window.

In other examples, image encoder 220 may include a vision longformer, a focal transformer, residual network, or other encoders with hierarchical architecture that has the flexibility to model various scales, has linear computational complexity with respect to image size (e.g., for performing dense prediction tasks such as object detection and segmentation), and maintains performance benefits of the transformer self-attention operations.

As one example, the patch embedding and patch merging modules in the swin transformer may be substituted or augmented with convolutional embedding layers described for CVT. For the CVT, the self-attention utilizes the convolutional projections. As such, projection layers may be predicted prior to self-attention. In the projection layers the hierarchical vision transformer may consider the window based convolutional operations instead of whole layer, fully connected projections. This can save memory and save on computations. The CVT and shifted windows approach occur in different levels; once in performing the self-attention, and once in doing more efficient projection. As such, the operations do not interfere with each other and can be combined together.

The resulting hierarchical vision transformer may be implemented with global average pooling to extract image features. For example, two or more linear projection layers may be added on top of the image encoder and language encoder to match the dimensions of image and language features. Based on the hierarchical structure of the image encoder, feature pyramids can be output from the different scale levels. The feature pyramid scale levels can then be concatenated and scaled-down or scaled-up into a 3-dimensional tensor with dimensions level×space×channel.

As web-crawled data often comprises noisy freeform texts (e.g., word, phrase or sentence), to attain more effective learning, a unified image-text contrastive learning module 225 may be employed. Traditional models implicitly assume that each image-text pair has a unique caption, which allows other captions to be considered negative examples. However, in web-scale data, multiple images can be associated with identical captions and thus can be treated as positive pairs in contrastive learning.

Unified image-text contrastive learning may allow the pre-trained model to be pre-trained in an image-label-description space. For example, given an image-text pair, triplet data (x, t, y) may be generated via a text-hash-table, where x is the image, t is the language description (i.e., hash value), and y is the language label (i.e., hash key) indicating the index of unique language description in the dataset. Identical language descriptions may be mapped to the same hash key or language label, allowing for clustering of data into categories. Thus, all image-text pairs mapped to the same label y are regarded as positive for the purpose of universal image-text contrastive learning. Others may still be regarded as negative. The unified learning objective in the common image-label-description space may thus unify two popular learning paradigms—mapping images to the label for learning discriminative representations (i.e., supervised learning) and assigning each description with a unique label for language-image pre-training (i.e., contrastive learning).

In many scenarios, long language descriptions with rich content may be more beneficial for image-text representation learning than short descriptions (e.g., one or two words). As such, unified image-text contrastive learning module 225 may enrich short descriptions via prompt templates e.g., "A photo of the [WORD]", "A cropped photo of [WORD]", et. al., as data augmentation. During training, one or more templates may be randomly selected to generate t for each short language description. Hash keys and language labels may allow attributes to be applied to objects in an image—such as a large dog or black dog rather than simply a dog. This may further enable the use of segmentation masks.

The image encoder 220 and language encoder 222 may be denoted $f_\theta$ and $f_\phi$, respectively. u and v are the normalized visual feature vector and language feature vector, respectively, where $$u = \frac{f_\theta(x)}{\|f_\theta(x)\|}, \text{ and } v = \frac{f_\phi(t)}{\|f_\phi(t)\|}.$$

is a learnable temperature.

Given a mini-batch B, a bi-directional supervised contrastive learning objective may be used between images and language descriptions to train the model as:

$$\mathcal{L} = \mathcal{L}_{i2t} + \mathcal{L}_{t2i} \tag{1}$$

which includes two contrastive terms: the supervised image-to-language contrastive loss $$\mathcal{L}_{i2t} = -\sum_{i \in \mathcal{B}} \frac{1}{|\mathcal{P}(i)|} \sum_{k \in \mathcal{P}(i)} \log \frac{\exp(\tau u_i v_k)}{\sum_{j \in \mathcal{B}} \exp(\tau u_i v_j)} \tag{2}$$

where $k \in P(i) = \{k | k \in B, y_k = y_i\}$, and the supervised language-to-image contrastive loss $$\mathcal{L}_{t2i} = -\sum_{j \in \mathcal{B}} \frac{1}{|Q(j)|} \sum_{k \in Q(j)} \log \frac{\exp(\tau u_k v_j)}{\sum_{i \in \mathcal{B}} \exp(\tau u_i v_j)} \tag{3}$$

where $k \in Q(j) = \{k | k \in B, y_k = y_j\}$.

The generated language prompt may not represent a precise description for an image, such as its naturally associated text description from the Internet. While this might not affect classification accuracy, it may impact the performance of the pre-trained model in retrieval and vision-language tasks. To mitigate the negative effect from augmented prompts, the training may separated into two stages. In a first stage, augmented texts are used for training. In a second stage, all augmented data is excluded for continuing training. The first stage may use all or some of the raw, non-augmented texts for training. In some examples, the unified loss functions in the contrast learning may be leveraged for both short descriptions and augmented descriptions.

To train the computer vision foundation model on a large-scale dataset, scalable training infrastructure 240 faces two main challenges e.g., reducing memory cost on each graphics processing unit (GPU) and increasing the throughput. Reducing the memory cost enables increasing the overall amounts of data assigned to each GPU and also allows for larger batch sizes, which has been shown to be effective for contrastive learning. Increasing the throughput can significantly speed up the whole training process and thus reduce carbon emissions. Several techniques can be combined to achieve these two goals.

One technique employs a zero-redundancy optimizer (ZeRO). The ZeRO technique may partition the optimizer states, gradients and parameters across the GPUs so that each partition is updated locally. Thus, the memory consumption is largely reduced.

Another technique is activation checkpointing. For a checkpointed model component, e.g., multi-head attention, activation checkpointing reruns a forward pass during the backward pass. In this way, the internal gradients in the component do not need to be stored in the forward pass. This may reduce the memory costs of training.

Mixed-precision Training may be used to train various operations with different numerical precision (e.g., float-32 or float-16). Float-32 may be used for numerically less stable operations, such as layer normalization while float-16 is used for the remaining operations. Such a combination improves the training throughput while maintaining the model performance.

The gradient cache technique is able to increase the total batch size in a training step. A large batch size has been shown to be beneficial in learning better representations. However, it is bounded by available GPU memory. To resolve this problem, the contrastive loss may be factored in by breaking the large batch gradient update into several sub-updates that can fit into GPU memory. This enables training large-scale models with a large batch size.

Combined, these techniques may allow for consistent reduction in GPU memory for variable batch sizes on various numbers of GPUs. Once memory costs are reduced, more data can be fit into training batches, thus significantly increasing the throughput.

The output of pre-training model 212 by itself is typically incomplete, but may serve as a common base on which many task-specific models are built via adaptation. Adaptation models 215 may work with the pre-trained model to provide extensibility e.g., to extend the learned feature representation along the space, time, and modality axes shown in FIG. 1. Further, adaptation may work with the pre-trained model to enable transferability. In other words, transferability may allow the pre-trained model to be efficiently adapted for cross-domain, few-shot, and zero-shot transfer, etc. and emerge commonly. Adaptation thus accelerates deployment of the fully trained model efficiently by continuing training with fewer epochs (e.g., in retrieval), or minimizing model customization for various domains that application-developers can use.

Figure 3:
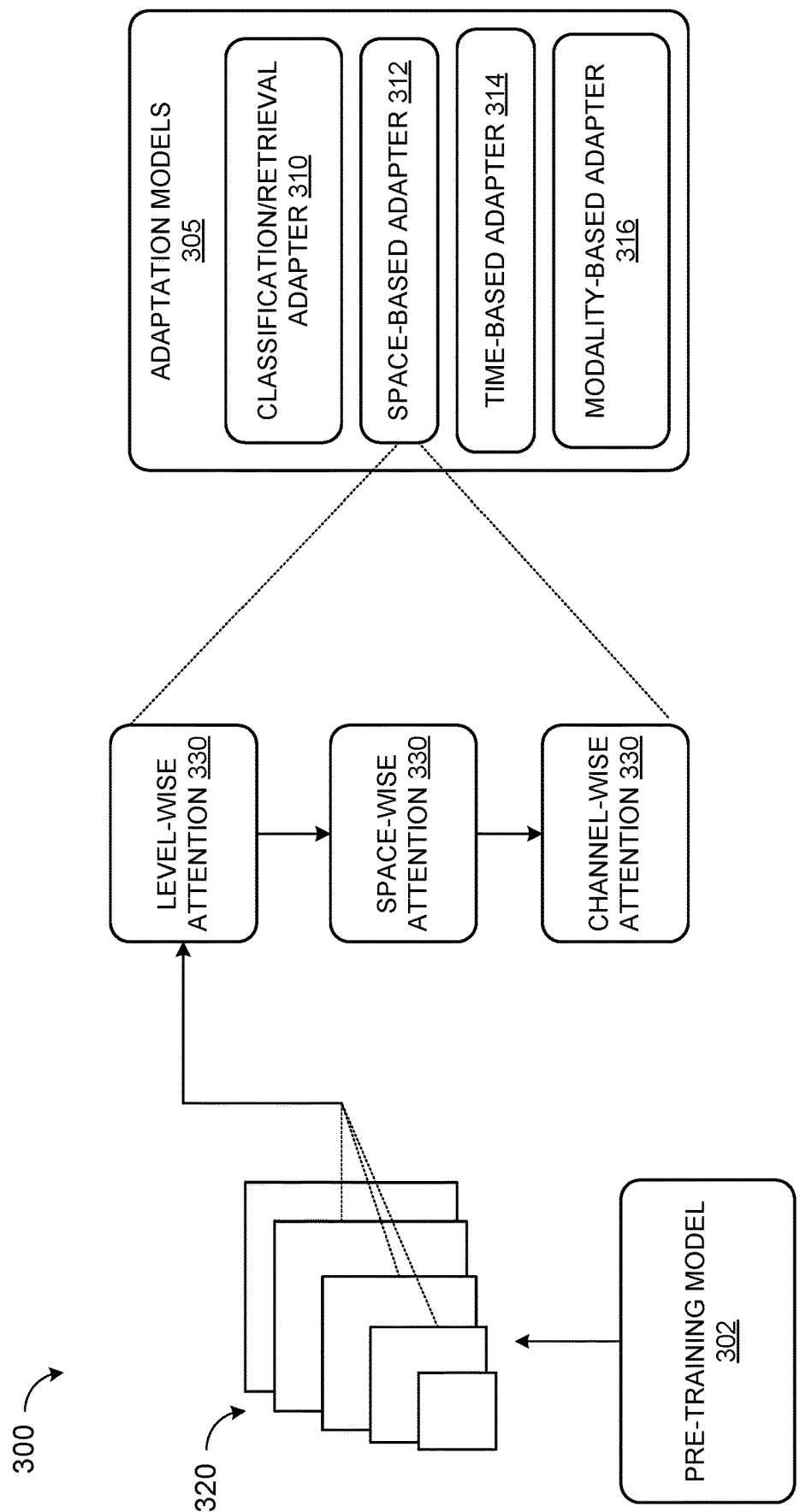
FIG. 3 schematically shows a computer vision foundation model 300.

FIG. 3 schematically shows a computer vision foundation model 300. Computer vision foundation model 300 may include at least a pre-training model 302 and a set of adaptation models 305. Pre-training model 302 may be an example of pre-training model 212, and may include a hierarchical vision transformer with shifted windows and convolutional embedding, such as a modified swin transformer.

Example adaptation models are shown, but any suitable adapter that can operate on the output of pre-training model 302 may be used. In this example, adaptation models 305 include classification/retrieval adapter 310; space-based adapter 312 (e.g. coarse to fine-grained via a Dynamic Head adapter); time-based adapter 314 (e.g. static to dynamic via video hierarchical video adapter); and modality-based adapter 316 modality (e.g. visual signal to visual-language via a modified Multimodal end-to-end transformer (ME-TER) adapter).

Space-based adapter 312 may extend the global image-text fused representations output by pre-training model 302 via object-level visual representation learning. This approach may be applied to dense prediction tasks such as object detection. As one example, the framework of computer vision foundation model 300 enables appending one or more modules to the image encoder of pre-training model 302, such as Dynamic Head, Dynamic Detection Transformer (DETR), etc., as well as a unified attention mechanism for the detection head, for continuing coarse-to-fine-grained visual representation learning.

Pre-training model 302 may output a plurality of feature pyramids 320 from different scale levels of the hierarchical vision transformer. Ideally, fully attentions would be built based on the features in feature pyramids 320, but the computational cost of doing so is enormously high. As such, the images can be decoupled into multiple stages using different attention mechanisms to diversify this cost.

For example, Dynamic Head and similar modules may deploy three attention mechanisms, each on one of the orthogonal dimensions of the tensor, i.e., level-wise 330, spatial-wise 332, and channel-wise 334. Compared with building a single self-attention mechanism over this tensor, this multi-dimensional approach makes the computation more affordable and enables more efficient learning. The three attention mechanisms are applied sequentially allowing for effective stacking of multiple blocks consisting of such three attention layers together. The size of the input dataset may be increased using bounding boxes, pseudo bounding boxes, annotations, and pseudolabels.

Time-based adapter 314 may extend the global image-text fused representations output by pre-training model 302 to video applications using an adapter based on the hierarchical vision transformer with shifted windows and convolutional embedding described herein. The self-attention based design in transformer-based models makes it possible to unify the systems of image and video recognition. The hierarchical vision transformer (e.g., image encoder 220) may be adapted for the video domain with minimum changes. As an example, the image tokenization layer may simply be replaced with a video tokenization layer, extending the transformer from 2D convolutional layers to 3D convolutional layers, which may convert each 3D tube into one token. As an initialization to 3D convolutional weights, the pre-trained 2D convolutional weights of may be duplicated along the temporal dimension and divided by the temporal kernel size to keep the mean and variance of the output unchanged. Second, video transforming may use a 3D convolution-based patch merging operator instead of a 2D patch merging operator. Such overlapped token merging can enhance spatial and temporal interactions among tokens. Third, the 2D shifted window design may be replaced with 3D shifted local windows in self-attention layers, for example, by duplicating the 2D relative positional embedding matrix from the pre-trained model along the temporal dimension to initialize the 3D positional embedding matrix. In this way, the 2D relative positional embedding is the same for each temporal shift.

In addition, all other layers and weights (including self-attention, FFN) can be inherited directly from the pre-trained vision model. To mitigate memory issues in the video loader, a relatively small window size may be employed in early stages of training, with larger window sizes in its later stages.

In the vision-language area, e.g. visual question answering (VQA) and image captioning, fine-grained, object-level representation is indispensable. Object detectors have been used as a de facto tool for image feature extraction that are then fed into a fusion network for prediction. Another method is to use end-to-end approaches to reduce dependency on the object bounding box, instead considering grid-based feature representations as the fine-grained features for V+L tasks. Modality-based adapter 316 may extend the global image-text fused representations output by pre-training model 302 via fine-grained V+L representation learning. As one example, a METER adapter may be used. In one example, the image encoder of METER may be replaced by a hierarchical vision transformer with shifted windows and convolutional embedding. A language encoder utilizing Bidirectional Encoder Representations from Transformers (BERT)-based architecture may be used by time-based adapter 314.

The two modalities may then be fused together to learn the contextual representation with a transformer network based on cross attention. Such a model may be pre-trained with the image-text matching (ITM) loss and masked language modeling (MLM) loss. The model may then be fine-tuned on the subject downstream task (e.g., VQA tasks, image captioning).

Figure 4:
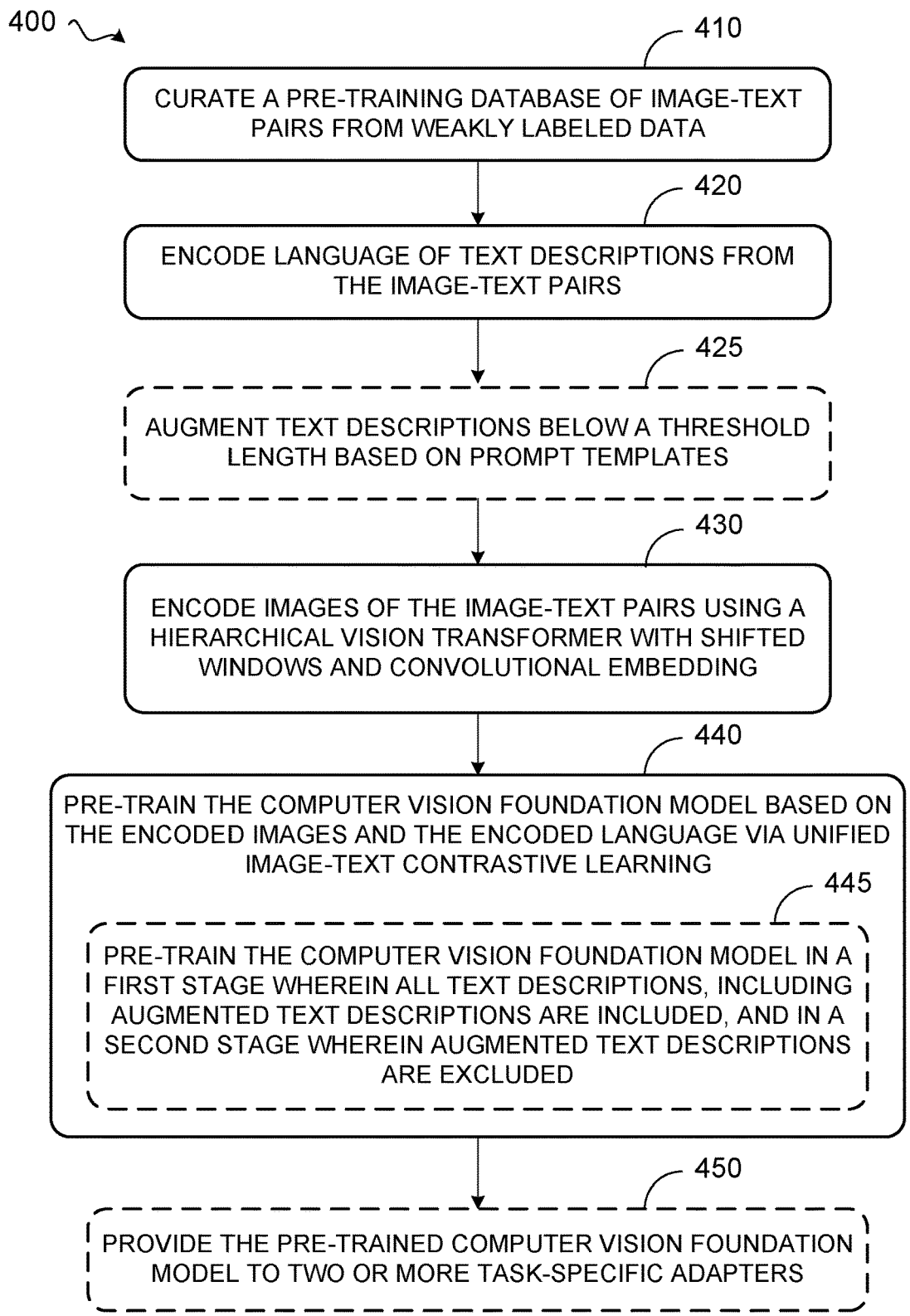
FIG. 4 is a flow diagram for an example method for pre-training a computer vision foundation model.

FIG. 4 depicts an example method 400 for pre-training a computer vision foundational model. Method 400 may be executed by a computing system, such as computer vision development system 200. Method 400. At 410, method 400 includes curating a pre-training database of image-text pairs from weakly labeled data, such as publicly available web-scale data.

At 420, method 400 includes encoding language of text descriptions from the image-text pairs. Optionally, at 425, method 400 includes augmenting text descriptions below a threshold length based on prompt templates. At 430, method 400 includes encoding images of the image-text pairs using a hierarchical vision transformer with shifted windows and convolutional embedding. In some examples, the hierarchical vision transformer is a modified swin transformer. Such a hierarchical vision transformer may utilize shifted windows in determining a local attention, and may further utilize convolutional operations in considering spatial relationships.

At 440, method 400 includes, pre-training the computer vision foundation model based on the encoded images and the encoded language via a unified image-text contrastive learning module. The unified image-text contrastive learning module may be configured to map identical language descriptions to a same language label.

Optionally, at 445, wherein augmented text descriptions are used, pre-training the computer vision foundation model based on the encoded images and the encoded language comprises pre-training the computer vision foundation model in a first stage wherein all text descriptions, including augmented text descriptions are included, and in a second stage wherein augmented text descriptions are excluded.

Optionally, at 450, method 400 includes providing the pre-trained computer vision foundation model to two or more task-specific adapters. For example, providing the pre-trained computer vision foundation model to two or more task-specific adapters may include providing a plurality of feature pyramids from different scale levels of the hierarchical vision transformer. The two or more task-specific adapters may include two or more extensibility adapters configured to receive a plurality of feature pyramids from different scale levels of the hierarchical vision transformer, and to extend learned feature representations of the feature pyramids in one or more dimensions of a computer vision task problem space. For example, the two or more extensibility adapters include a space-based adapter configured to extend the learned feature representation in a space-based dimension of the computer vision task problem space, and wherein the space-based adapter deploys level-wise, spatial-wise, and channel-wise attention mechanisms.

Additionally or alternatively, the two or more extensibility adapters may include a time-based adapter configured to extend the learned feature representation in a time-based dimension of the computer vision task problem space, and wherein the time-based adapter is a fine-grained V+L representation adapter configured to use hierarchical vision transformer with shifted windows and convolutional embedding as an image encoder.

Additionally or alternatively, the two or more extensibility adapters may include a modality-based adapter configured to extend the learned feature representation in a modality-based dimension of the computer vision task problem space, and wherein the modality-based adapter is a video representation adapter configured to implement a video adaptation of the hierarchical vision transformer with shifted windows and convolutional embedding to encode images in three-dimensions, and to train on self-attention layers with three-dimensionally shifted local windows.

In some embodiments, the methods and processes described herein may be tied to a computing system of one or more computing devices. In particular, such methods and processes may be implemented as a computer-application program or service, an application-programming interface (API), a library, and/or other computer-program product.

Figure 5:
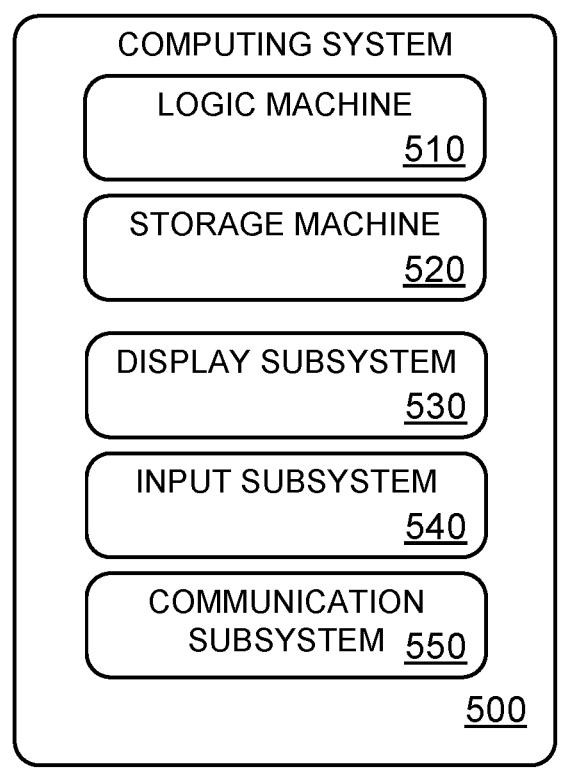
FIG. 5 schematically shows an example computing system.

FIG. 5 schematically shows a non-limiting embodiment of a computing system 500 that can enact one or more of the methods and processes described above. Computing system 500 is shown in simplified form. Computing system 500 may take the form of one or more personal computers, server computers, tablet computers, home-entertainment computers, network computing devices, gaming devices, mobile computing devices, mobile communication devices (e.g., smart phone), and/or other computing devices.

Computing system 500 includes a logic machine 510 and a storage machine 520. Computing system 500 may optionally include a display subsystem 530, input subsystem 540, communication subsystem 550, and/or other components not shown in FIG. 5. Computer vision development system 200 and components thereof may be examples of computing system 500. Computer vision development system 200 may comprise numerous computing system, each of which may include one or more logic machine and one or more storage machines.

Logic machine 510 includes one or more physical devices configured to execute instructions. For example, the logic machine may be configured to execute instructions that are part of one or more applications, services, programs, routines, libraries, objects, components, data structures, or other logical constructs. Such instructions may be implemented to perform a task, implement a data type, transform the state of one or more components, achieve a technical effect, or otherwise arrive at a desired result.

The logic machine may include one or more processors configured to execute software instructions. Additionally or alternatively, the logic machine may include one or more hardware or firmware logic machines configured to execute hardware or firmware instructions. Processors of the logic machine may be single-core or multi-core, and the instructions executed thereon may be configured for sequential, parallel, and/or distributed processing. Individual components of the logic machine optionally may be distributed among two or more separate devices, which may be remotely located and/or configured for coordinated processing. Aspects of the logic machine may be virtualized and executed by remotely accessible, networked computing devices configured in a cloud-computing configuration.

Storage machine 520 includes one or more physical devices configured to hold instructions executable by the logic machine to implement the methods and processes described herein. When such methods and processes are implemented, the state of storage machine 520 may be transformed—e.g., to hold different data.

Storage machine 520 may include removable and/or built-in devices. Storage machine 520 may include optical memory (e.g., CD, DVD, HD-DVD, Blu-Ray Disc, etc.), semiconductor memory (e.g., RAM, EPROM, EEPROM, etc.), and/or magnetic memory (e.g., hard-disk drive, floppy-disk drive, tape drive, MRAM, etc.), among others. Storage machine 520 may include volatile, nonvolatile, dynamic, static, read/write, read-only, random-access, sequential-access, location-addressable, file-addressable, and/or content-addressable devices.

It will be appreciated that storage machine 520 includes one or more physical devices. However, aspects of the instructions described herein alternatively may be propagated by a communication medium (e.g., an electromagnetic signal, an optical signal, etc.) that is not held by a physical device for a finite duration.

Aspects of logic machine 510 and storage machine 520 may be integrated together into one or more hardware-logic components. Such hardware-logic components may include field-programmable gate arrays (FPGAs), program- and application-specific integrated circuits (PASIC/ASICs), program- and application-specific standard products (PSSP/ASSPs), system-on-a-chip (SOC), and complex programmable logic devices (CPLDs), for example.

As used herein, the term "machine" is used to collectively refer to the combination of hardware, firmware, software, instructions, and/or any other components cooperating to provide computer functionality. In other words, "machines" are never abstract ideas and always have a tangible form. A machine may be instantiated by a single computing device, or a machine may include two or more sub-components instantiated by two or more different computing devices. In some implementations a machine includes a local component (e.g., software application executed by a computer processor) cooperating with a remote component (e.g., cloud computing service provided by a network of server computers). The software and/or other instructions that give a particular machine its functionality may optionally be saved as one or more unexecuted modules on one or more suitable storage devices.

Machines may be implemented using any suitable combination of state-of-the-art and/or future machine learning (ML), AI, and/or NLP techniques. Non-limiting examples of techniques that may be incorporated in an implementation of one or more machines include support vector machines, multi-layer neural networks, convolutional neural networks (e.g., including spatial convolutional networks for processing images and/or videos, temporal convolutional neural networks for processing audio signals and/or natural language sentences, and/or any other suitable convolutional neural networks configured to convolve and pool features across one or more temporal and/or spatial dimensions), recurrent neural networks (e.g., long short-term memory networks), associative memories (e.g., lookup tables, hash tables, Bloom Filters, Neural Turing Machine and/or Neural Random Access Memory), word embedding models (e.g., GloVe or Word2Vec), unsupervised spatial and/or clustering methods (e.g., nearest neighbor algorithms, topological data analysis, and/or k-means clustering), graphical models (e.g., (hidden) Markov models, Markov random fields, (hidden) conditional random fields, and/or AI knowledge bases), and/or natural language processing techniques (e.g., tokenization, stemming, constituency and/or dependency parsing, and/or intent recognition, segmental models, and/or supersegmental models (e.g., hidden dynamic models)).

In some examples, the methods and processes described herein may be implemented using one or more differentiable functions, wherein a gradient of the differentiable functions may be calculated and/or estimated with regard to inputs and/or outputs of the differentiable functions (e.g., with regard to training data, and/or with regard to an objective function). Such methods and processes may be at least partially determined by a set of trainable parameters. Accordingly, the trainable parameters for a particular method or process may be adjusted through any suitable training procedure, in order to continually improve functioning of the method or process.

Non-limiting examples of training procedures for adjusting trainable parameters include supervised training (e.g., using gradient descent or any other suitable optimization method), zero-shot, few-shot, unsupervised learning methods (e.g., classification based on classes derived from unsupervised clustering methods), reinforcement learning (e.g., deep Q learning based on feedback) and/or generative adversarial neural network training methods, belief propagation, RANSAC (random sample consensus), contextual bandit methods, maximum likelihood methods, and/or expectation maximization. In some examples, a plurality of methods, processes, and/or components of systems described herein may be trained simultaneously with regard to an objective function measuring performance of collective functioning of the plurality of components (e.g., with regard to reinforcement feedback and/or with regard to labelled training data). Simultaneously training the plurality of methods, processes, and/or components may improve such collective functioning. In some examples, one or more methods, processes, and/or components may be trained independently of other components (e.g., offline training on historical data).

Language models may utilize vocabulary features to guide sampling/searching for words for recognition of speech. For example, a language model may be at least partially defined by a statistical distribution of words or other vocabulary features. For example, a language model may be defined by a statistical distribution of n-grams, defining transition probabilities between candidate words according to vocabulary statistics. The language model may be further based on any other appropriate statistical features, and/or results of processing the statistical features with one or more machine learning and/or statistical algorithms (e.g., confidence values resulting from such processing). In some examples, a statistical model may constrain what words may be recognized for an audio signal, e.g., based on an assumption that words in the audio signal come from a particular vocabulary.

Alternately or additionally, the language model may be based on one or more neural networks previously trained to represent audio inputs and words in a shared latent space, e.g., a vector space learned by one or more audio and/or word models (e.g., wav2letter and/or word2vec). Accordingly, finding a candidate word may include searching the shared latent space based on a vector encoded by the audio model for an audio input, in order to find a candidate word vector for decoding with the word model. The shared latent space may be utilized to assess, for one or more candidate words, a confidence that the candidate word is featured in the speech audio.

The language model may be used in conjunction with an acoustical model configured to assess, for a candidate word and an audio signal, a confidence that the candidate word is included in speech audio in the audio signal based on acoustical features of the word (e.g., mel-frequency cepstral coefficients, formants, etc.). Optionally, in some examples, the language model may incorporate the acoustical model (e.g., assessment and/or training of the language model may be based on the acoustical model). The acoustical model defines a mapping between acoustic signals and basic sound units such as phonemes, e.g., based on labelled speech audio. The acoustical model may be based on any suitable combination of state-of-the-art or future ML and/or AI models, for example: deep neural networks (e.g., long short-term memory, temporal convolutional neural network, restricted Boltzmann machine, deep belief network), hidden Markov models (HMM), conditional random fields (CRF) and/or Markov random fields, Gaussian mixture models, and/or other graphical models (e.g., deep Bayesian network). Audio signals to be processed with the acoustic model may be pre-processed in any suitable manner, e.g., encoding at any suitable sampling rate, Fourier transform, band-pass filters, etc. The acoustical model may be trained to recognize the mapping between acoustic signals and sound units based on training with labelled audio data. For example, the acoustical model may be trained based on labelled audio data comprising speech audio and corrected text, in order to learn the mapping between the speech audio signals and sound units denoted by the corrected text. Accordingly, the acoustical model may be continually improved to improve its utility for correctly recognizing speech audio.

In some examples, in addition to statistical models, neural networks, and/or acoustical models, the language model may incorporate any suitable graphical model, e.g., an HMM or a CRF. The graphical model may utilize statistical features (e.g., transition probabilities) and/or confidence values to determine a probability of recognizing a word, given the speech audio and/or other words recognized so far. Accordingly, the graphical model may utilize the statistical features, previously trained machine learning models, and/or acoustical models to define transition probabilities between states represented in the graphical model.

The terms "module," "program," and "engine" may be used to describe an aspect of computing system 500 implemented to perform a particular function. In some cases, a module, program, or engine may be instantiated via logic machine 510 executing instructions held by storage machine 520. It will be understood that different modules, programs, and/or engines may be instantiated from the same application, service, code block, object, library, routine, API, function, etc. Likewise, the same module, program, and/or engine may be instantiated by different applications, services, code blocks, objects, routines, APIs, functions, etc. The terms "module," "program," and "engine" may encompass individual or groups of executable files, data files, libraries, drivers, scripts, database records, etc.

It will be appreciated that a "service", as used herein, is an application program executable across multiple user sessions. A service may be available to one or more system components, programs, and/or other services. In some implementations, a service may run on one or more server-computing devices.

When included, display subsystem 530 may be used to present a visual representation of data held by storage machine 520. This visual representation may take the form of a graphical user interface (GUI). As the herein described methods and processes change the data held by the storage machine, and thus transform the state of the storage machine, the state of display subsystem 530 may likewise be transformed to visually represent changes in the underlying data. Display subsystem 530 may include one or more display devices utilizing virtually any type of technology. Such display devices may be combined with logic machine 510 and/or storage machine 520 in a shared enclosure, or such display devices may be peripheral display devices.

When included, input subsystem 540 may comprise or interface with one or more user-input devices such as a keyboard, mouse, touch screen, or game controller. In some embodiments, the input subsystem may comprise or interface with selected natural user input (NUI) componentry. Such componentry may be integrated or peripheral, and the transduction and/or processing of input actions may be handled on- or off-board. Example NUI componentry may include a microphone for speech and/or voice recognition; an infrared, color, stereoscopic, and/or depth camera for machine vision and/or gesture recognition; a head tracker, eye tracker, accelerometer, and/or gyroscope for motion detection and/or intent recognition; as well as electric-field sensing componentry for assessing brain activity.

When included, communication subsystem 550 may be configured to communicatively couple computing system 500 with one or more other computing devices. Communication subsystem 550 may include wired and/or wireless communication devices compatible with one or more different communication protocols. As non-limiting examples, the communication subsystem may be configured for communication via a wireless telephone network, or a wired or wireless local- or wide-area network. In some embodiments, the communication subsystem may allow computing system ?? to send and/or receive messages to and/or from other devices via a network such as the Internet.

The methods and processes disclosed herein may be configured to give users and/or any other humans control over any private and/or potentially sensitive data. Whenever data is stored, accessed, and/or processed, the data may be handled in accordance with privacy and/or security standards. When user data is collected, users or other stakeholders may designate how the data is to be used and/or stored. Users may opt-in and/or opt-out of data collection at any time. After data has been collected, users may issue a command to delete the data, and/or restrict access to the data. All potentially sensitive data optionally may be encrypted and/or, when feasible anonymized, to further protect user privacy. Users may designate portions of data, metadata, or statistics/results of processing data for release to other parties, e.g., for further processing. Data that is private and/or confidential may be kept completely private, e.g., only decrypted temporarily for processing, or only decrypted for processing on a user device and otherwise stored in encrypted form. Users may hold and control encryption keys for the encrypted data. Alternately or additionally, users may designate a trusted third party to hold and control encryption keys for the encrypted data, e.g., so as to provide access to the data to the user according to a suitable authentication protocol.

When the methods and processes described herein incorporate ML and/or AI components, the ML and/or AI components may make decisions based at least partially on training of the components with regard to training data. Accordingly, the ML and/or AI components can and should be trained on diverse, representative datasets that include sufficient relevant data for diverse users and/or populations of users. In particular, training data sets should be inclusive with regard to different human individuals and groups, so that as ML and/or AI components are trained, their performance is improved with regard to the user experience of the users and/or populations of users.

ML and/or AI components may additionally be trained to make decisions so as to minimize potential bias towards human individuals and/or groups. For example, when AI systems are used to assess any qualitative and/or quantitative information about human individuals or groups, they may be trained so as to be invariant to differences between the individuals or groups that are not intended to be measured by the qualitative and/or quantitative assessment, e.g., so that any decisions are not influenced in an unintended fashion by differences among individuals and groups. Furthermore, ML and/or AI systems may be continually monitored to identify potential bias, errors, and/or unintended outcomes.

In one example, a method for pre-training a computer vision foundation model comprises curating a pre-training database of image-text pairs from weakly labeled data; encoding language of text descriptions from the image-text pairs; encoding images of the image-text pairs using a hierarchical vision transformer with shifted windows and convolutional embedding; and pre-training the computer vision foundation model based on the encoded images and the encoded language via a unified image-text contrastive learning module. The technical effects of encoding images using a hierarchical vision transformer with shifted windows and convolutional embedding include a reduced processor load and a reduction in required memory space. In such an example, or any other example, the hierarchical vision transformer is additionally or alternatively a modified swin transformer. In any of the preceding examples, or any other example, the hierarchical vision transformer additionally or alternatively utilizes shifted windows in determining a local attention, and utilizes convolutional operations in considering spatial relationships. In any of the preceding examples, or any other example, the method additionally or alternatively comprises augmenting text descriptions below a threshold length based on prompt templates. In any of the preceding examples, or any other example, pre-training the computer vision foundation model based on the encoded images and the encoded language additionally or alternatively comprises pre-training the computer vision foundation model in a first stage wherein augmented text descriptions are included, and in a second stage wherein augmented text descriptions are excluded. In any of the preceding examples, or any other example, the unified image-text contrastive learning module additionally or alternatively maps identical language descriptions to a same language label. In any of the preceding examples, or any other example, the method additionally or alternatively comprises providing the pre-trained computer vision foundation model to two or more task-specific adapters. In any of the preceding examples, or any other example, providing the pre-trained computer vision foundation model to two or more task-specific adapters additionally or alternatively includes a providing a plurality of feature pyramids from different scale levels of the hierarchical vision transformer.

In another example, a system for pre-training a computer vision foundation model comprises a data curation engine configured to curate a pre-training database of image-text pairs from weakly labeled data; and a pre-training model comprising a language encoder configured to encode language of text descriptions from the image-text pairs; an image encoder configured to encode images of the image-text pairs using a hierarchical vision transformer with shifted windows and convolutional embedding; and a unified image-text contrastive learning module configured to pre-train the computer vision foundation model based on the encoded images and the encoded language. The technical effects of curating a pre-training database with weakly labeled data include a reduction in human supervision requirements, thus reducing error rates and enabling scalability with the size of the pre-training database. In such an example, or any other example, the hierarchical vision transformer is additionally or alternatively a modified swin transformer. In any of the preceding examples, or any other example, the hierarchical vision transformer additionally or alternatively utilizes shifted windows in determining a local attention, and additionally or alternatively utilizes convolutional operations in considering spatial relationships. In any of the preceding examples, or any other example, the unified image-text contrastive learning module is additionally or alternatively configured to augmenting text descriptions below a threshold length based on prompt templates. In any of the preceding examples, or any other example, pre-training the computer vision foundation model is additionally or alternatively based on the encoded images and the encoded language additionally or alternatively comprises pre-training the computer vision foundation model in a first stage wherein augmented text descriptions are included, and in a second stage wherein augmented text descriptions are excluded. In any of the preceding examples, or any other example, the unified image-text contrastive learning module is additionally or alternatively configured to map identical language descriptions to a same language label. In any of the preceding examples, or any other example, the resulting pre-trained computer vision foundation model is additionally or alternatively provided to two or more task-specific adapters. In any of the preceding examples, or any other example, providing the pre-trained computer vision foundation model to two or more task-specific adapters additionally or alternatively includes a providing a plurality of feature pyramids from different scale levels of the hierarchical vision transformer.

In yet another example, a computer vision development system comprises a data curation engine configured to curate a pre-training database of image-text pairs from weakly labeled data; and a computer vision foundation model, comprising a pre-training model comprising a language encoder configured to encode language of text descriptions from the image-text pairs; an image encoder configured to encode images of the image-text pairs using a hierarchical vision transformer with shifted windows and convolutional embedding; and a unified image-text contrastive learning module configured to pre-train the computer vision foundation model based on the encoded images and the encoded language; and two or more extensibility adapters configured to receive a plurality of feature pyramids from different scale levels of the hierarchical vision transformer, and to extend learned feature representations of the feature pyramids in one or more dimensions of a computer vision task problem space. The technical effects of employing two or more extensibility adapters include simplified software development, as multiple adapters can be bootstrapped to the same foundational model. In such an example, or any other example, the two or more extensibility adapters additionally or alternatively include a space-based adapter configured to extend the learned feature representation in a space-based dimension of a computer vision task problem space, and wherein the space-based adapter deploys level-wise, spatial-wise, and channel-wise attention mechanisms. In any of the preceding examples, or any other example, the two or more extensibility adapters additionally or alternatively include a time-based adapter configured to extend the learned feature representation in a time-based dimension of the computer vision task problem space, and wherein the time-based adapter is a fine-grained V+L representation adapter configured to use hierarchical vision transformer with shifted windows and convolutional embedding as an image encoder. In any of the preceding examples, or any other example, the two or more extensibility adapters additionally or alternatively include a modality-based adapter configured to extend the learned feature representation in a modality-based dimension of the computer vision task problem space, and the modality-based adapter is additionally or alternatively a video representation adapter configured to implement a video adaptation of the hierarchical vision transformer with shifted windows and convolutional embedding to encode images in three-dimensions, and to train on self-attention layers with three-dimensionally shifted local windows.

It will be understood that the configurations and/or approaches described herein are exemplary in nature, and that these specific embodiments or examples are not to be considered in a limiting sense, because numerous variations are possible. The specific routines or methods described herein may represent one or more of any number of processing strategies. As such, various acts illustrated and/or described may be performed in the sequence illustrated and/or described, in other sequences, in parallel, or omitted. Likewise, the order of the above-described processes may be changed.

The subject matter of the present disclosure includes all novel and non-obvious combinations and sub-combinations of the various processes, systems and configurations, and other features, functions, acts, and/or properties disclosed herein, as well as any and all equivalents thereof.

The invention claimed is:

1. A method for pre-training a computer vision foundation model, the method comprising:
curating a pre-training database of image-text pairs from weakly labeled data;
encoding language of text descriptions from the image-text pairs to obtain encoded language;
encoding images of the image-text pairs using a hierarchical vision transformer that generates projection layers using convolutional operations and utilizes shifted windows to determine local attention from the projection layers that are generated to obtain encoded images; and
pre-training the computer vision foundation model based on the encoded images and the encoded language via a unified image-text contrastive learning module.

2. The method of claim 1, wherein the hierarchical vision transformer is a modified swin transformer.

3. The method of claim 1, wherein the hierarchical vision transformer utilizes convolutional operations in considering spatial relationships.

4. The method of claim 1, further comprising augmenting text descriptions below a threshold length based on prompt templates.

5. The method of claim 1, wherein pre-training the computer vision foundation model based on the encoded images and the encoded language comprises pre-training the computer vision foundation model in a first stage wherein augmented text descriptions are included, and in a second stage wherein augmented text descriptions are excluded.

6. The method of claim 1, wherein the unified image-text contrastive learning module maps identical language descriptions to a same language label.

7. The method of claim 1, further comprising:
providing the pre-trained computer vision foundation model to two or more task-specific adapters.

8. The method of claim 7, wherein providing the pre-trained computer vision foundation model to two or more task-specific adapters includes a providing a plurality of feature pyramids from different scale levels of the hierarchical vision transformer.

9. A system for pre-training a computer vision foundation model, comprising:
a data curation engine configured to curate a pre-training database of image-text pairs from weakly labeled data; and
a pre-training model comprising:
a language encoder configured to encode language of text descriptions from the image-text pairs to obtain encoded language;
an image encoder configured to encode images of the image-text pairs using a hierarchical vision transformer by generating projection layers using convolutional operations and utilizing shifted windows in determining local attention from the projection layers that are generated to obtain encoded images; and
a unified image-text contrastive learning module configured to pre-train the computer vision foundation model based on the encoded images and the encoded language.

10. The system of claim 9, wherein the hierarchical vision transformer is a modified swin transformer.

11. The system of claim 9, wherein the hierarchical vision transformer utilizes convolutional operations in considering spatial relationships.

12. The system of claim 9, wherein the unified image-text contrastive learning module is further configured to augmenting text descriptions below a threshold length based on prompt templates.

13. The system of claim 9, wherein pre-training the computer vision foundation model based on the encoded images and the encoded language comprises pre-training the computer vision foundation model in a first stage wherein augmented text descriptions are included, and in a second stage wherein augmented text descriptions are excluded.

14. The system of claim 9, wherein the unified image-text contrastive learning module is further configured to map identical language descriptions to a same language label.

15. The system of claim 9, wherein the resulting pre-trained computer vision foundation model is provided to two or more task-specific adapters.

16. The system of claim 9, wherein providing the pre-trained computer vision foundation model to two or more task-specific adapters includes a providing a plurality of feature pyramids from different scale levels of the hierarchical vision transformer.

17. The method of claim 1, wherein the encoded images include information that represents features of images of the image-text pairs in one or more dimensions.

18. The method of claim 1, wherein the encoded language includes information that represents features of textual data of the image-text pairs in one or more dimensions.

19. The method of claim 1, wherein the projection layers are a subset of a set of layers used to pre-train the computer vision foundation model, and wherein the local attention is not determined from layers outside of the subset.

* * * * *